(12) United States Patent
Willems et al.

(10) Patent No.: US 7,540,256 B2
(45) Date of Patent: Jun. 2, 2009

(54) METHOD AND DEVICE FOR COATING FOOD PRODUCTS WITH AN UPPER LAYER OF COATING MATERIAL

(75) Inventors: Jacobus Wilhelmus Willems, Siebengewald (NL); Johannes Gerardus Martinus Antonius Zeegers, Sambeek (NL); Hendricus Franciscus Jacobus Maria van der Eerden, Gemert (NL)

(73) Assignee: Stork Titan B.V. (NL)

( * ) Notice: Subject to any disclaimer, the term of this patent is extended or adjusted under 35 U.S.C. 154(b) by 269 days.

(21) Appl. No.: 11/107,003

(22) Filed: Apr. 15, 2005

(65) Prior Publication Data

US 2005/0238761 A1    Oct. 27, 2005

(30) Foreign Application Priority Data

Apr. 27, 2004    (NL) .................................. 1026055

(51) Int. Cl.
 *B05C 19/06*    (2006.01)
(52) U.S. Cl. .............................. 118/13; 118/16; 118/24; 118/30; 118/308; 118/312; 99/494
(58) Field of Classification Search .................. 118/13, 118/16, 24, 30, 308, 312; 99/494, 450.1; 222/280, 287, 342, 343; 426/289
See application file for complete search history.

(56) References Cited

U.S. PATENT DOCUMENTS

| | | | | |
|---|---|---|---|---|
| 2,643,032 A | * | 6/1953 | Berndt | ........................ 222/254 |
| 4,936,248 A | | 6/1990 | Miller | |
| 6,523,726 B1 | * | 2/2003 | Tschantz | ..................... 222/353 |

FOREIGN PATENT DOCUMENTS

| | | |
|---|---|---|
| EP | 0113927 A1 | 7/1984 |
| EP | 1308099 A2 | 5/2003 |
| NL | 1011957  * | 11/2000 |
| NL | 1020511 A2 | 11/2003 |

* cited by examiner

*Primary Examiner*—Laura Edwards
(74) *Attorney, Agent, or Firm*—Ryan A. Schneider, Esq.; Troutman Sanders LLP

(57) ABSTRACT

In a method for coating at least the top of moving food products 100 with at least one layer of a free-flowing particulate coating material, coating material is poured from a storage container 60 over the moving food products. During the pouring, the coating material is partially segregated into coarse coating material 90 and relatively fine coating material, and substantially coarse coating material 90 is applied to the moving food products 100 first, followed by relatively fine coating material.

18 Claims, 3 Drawing Sheets

Figure 1:
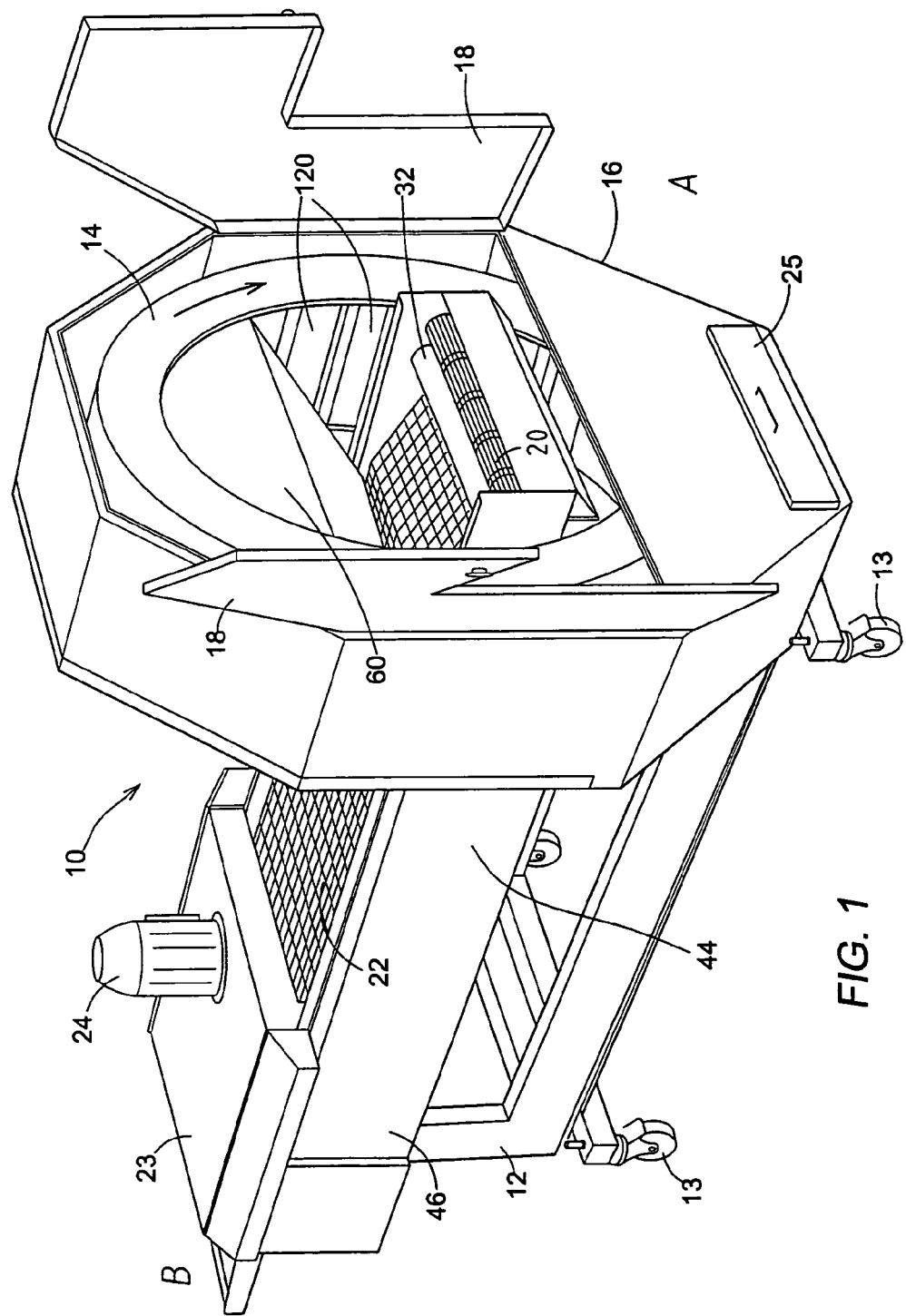

METHOD AND DEVICE FOR COATING FOOD PRODUCTS WITH AN UPPER LAYER OF COATING MATERIAL

In the first place, the invention relates to a method for coating at least the top of moving food products with at least one layer of a free-flowing particulate coating material, which method comprises a pouring step for pouring the coating material from a storage container over the moving food products.

Such a method is generally known in the field, for example from the Netherlands patent 1020511 by the Applicant. In one preferred embodiment of the coating method and device known from the above patent, a lower bed of coating material is formed on an endless conveyor belt, which is pervious to the coating material, and in which a guide plate is provided under the conveying part in a coating zone, on which lower bed the food products to be coated are then laid. Thereafter, an upper bed of coating material is formed on and around the food products from a hopper, which hopper is provided at the bottom with a funnel-shaped discharge opening which extends obliquely in the conveying direction of the conveying part and, if desired, may be provided with a pivotable or horizontally movable distribution element which can also have the function of an adjustable closure flap for the discharge opening of the hopper. Downstream of the coating zone, excess coating material is partly returned via the return part of the conveyor in order to form the lower bed and is partly returned to the storage container with the aid of a drum conveyor.

As a rule, coating material such as breadcrumbs, coating agent, flakes etc. does not have a uniform particle size, but a certain particle size distribution. Such a particle size distribution develops mainly during the preparation of the coating material. It has now been found that as a result thereof, when the food products are being coated with particulate coating material, the coating of coarse and fine coating material particles is often not of uniform composition and density. A difference in the coating with coarse coating particles and fine particles becomes visible in particular upon comparison of the bottom and top of the coated product. In addition, with a highly comminuting device, there will always be relatively many fine (powder) particles of the coating material present. During coating, a change in the composition of the coating material occurs over time.

It is an object of the invention to provide a method and device for coating at least the top of food products with free-flowing particulate coating material, in which the composition of the coating with regards to particle size can be controlled.

It is another object of the invention to provide a method and device of this type, in which the composition of the coating to be applied to the top of the products and the appearance of the top of the coated products can be matched to the bottom of the products.

A further object of the invention is to provide a coating method and device for providing a uniform coating on the bottom and top of the product.

With the method of the type mentioned in the introduction, according to the invention, the coating material is segregated during said pouring step into coarse coating material and relatively fine coating material, and substantially coarse coating material is applied to the moving food products first, followed by relatively fine coating material.

It has been found that the abovementioned drawbacks of the prior art are due to the fact that when the coating material is poured onto the food products, the surface of the products is often covered with a (continuous) layer of fine coating material so that the relatively coarse coating material cannot adhere to the food products, or can only adhere to them to a lesser degree.

The invention provides for the at least partial segregation of the coating material during the pouring step into coarse coating material particles and relatively fine coating material particles. The degree of segregation can be adjusted. Subsequently, the food products to be coated, at least the top and sides, are first brought into contact with mainly the coarse coating material particles, which can therefore adhere to the food products well. Thereafter, the food products are brought into contact with the remainder of the coating material, with the relatively fine coating material particles adhering to the surface between the relatively coarse particles and thereby filling the gaps between the latter. In this manner, the method according to the invention results in products the appearance of the top of which can be controlled.

With the method according to the invention the food products to be coated, such as shaped products from a meat mass, for example hamburgers, chicken burgers etc., which are often provided with an adhesive layer based on egg whites (batter) after shaping and prior to the coating, are placed on the conveyor via a supply belt. The conveyor is advantageously an endless conveyor belt which is pervious to the coating material and has an upper conveying part for carrying the food products, and a lower return part, which conveyor belt is guided around reversing rolls and driven in the usual manner. In the case of a conveyor pervious to the coating material, a guide plate is arranged under the conveying part in the coating zone (the area where the products are coated with the aid of an upper bed of coating material, and optionally a lower bed in order to coat the bottom of food products as well), which guide plate is impervious to the coating material. The conveyor moves at a constant speed and thus entrains the bed or beds of coating material. The coating material may be chosen from customary coating materials for the abovementioned products, such as coating agent, breadcrumbs, flakes (of grains) etc. The coating material is poured out of the storage container in such a manner that partial segregation thereof into a coarse fraction and a relatively fine fraction occurs. The food products, which are moved by the conveyor, preferably on a lower bed of coating material applied to the conveying part thereof, first come into contact with the coarse particles and are subsequently completely covered by the upper bed. After the coating zone, the excess material (approx. 90%) is returned in order to be re-used for coating subsequent products.

Advantageously, the segregation takes place naturally, i.e. without the use of separating means, such as screens etc., as will be explained below with reference to a preferred embodiment. The invention makes use of the inherent segregating properties of the particulate coating material in order to adjust the coarseness/fineness of the coating on the top of the food products.

In a preferred embodiment of the method according to the invention, a pouring mound is formed at a position downstream of the product supply on the conveying part of the conveyor, which pouring mound has a slope with respect to the conveying part of the conveyor which extends from the conveying part in the conveying direction towards the storage container, with the segregation taking place on the surface of the slope. As a result of the conveyor moving along, the food products are directed into the pouring mound near the bottom of the slope. It was found that the coarse coating material particles roll down the slope of the pouring mound faster than the relatively fine particles of the coating material, so that segregation occurs. As a result thereof, the composition of the coating material with regard to size is different at the bottom of the slope from that on and at the top of the pouring mound. At the bottom of the slope, there are relatively more coarse particles than relatively fine particles, so that the products first come into contact with the mainly coarse particles.

Advantageously, the pouring mound is formed by adjusting the discharge of coating material from the storage container and adjusting the throughput of coating material on the conveying part of the conveyor. The adjustment of the discharge preferably takes place with the aid of discharge control means, such as a slide or flap, for adjusting the discharge of coating material from the storage container. Such discharge control means determine the position of the discharge opening relative to the conveying part of the conveyor, more particularly the height of the upstream wall part of the storage container which delimits the discharge opening with respect to the conveying part of the conveyor. In a further preferred embodiment, the discharge control means preferably also determine the dimensions of the discharge opening of the storage container. The position of the upstream wall part determines the height of the pouring mound with respect to the conveying part or a lower bed present thereon, and thus the length of the slope. The length of the slope determines the degree of segregation. Usually, but not necessarily, the slope extends up to the discharge opening. The adjustment of the throughput is preferably carried out using flow restriction means for adjusting the throughput of coating material on the conveying part of the conveyor. Such flow restriction means, which are placed downstream of the discharge opening, determine the throughput of coating material. When sufficient coating material is supplied by the storage container, preferably adjusted by the discharge control means in the discharge opening as mentioned above, a pouring mound is created on the upstream side of the flow restriction means having a downward slope which is opposite to the conveying direction. The coating material as it were rolls down this slope at different speeds, depending on the particle size (weight). In a stable situation, coating material is continuously discharged by the conveyor and supplied from the storage container, so that the coating material on the upstream slope side of the pouring mound is always moving and continuously segregating. The food products first come into contact with the coarse particles and then with the fine particles, the latter filling the gaps between the coarse particles, as a result of which a dense structure is obtained. As an example of flow restriction means, a scraper element may be mentioned which is arranged transversely to the conveying direction and extends over the width of the conveyor. The bottom of this scraping element is situated at a distance from the top surface of the conveyor and thus determines the thickness of the upper bed and the throughput of the coating material on the conveyor.

Advantageously, as already mentioned above, when carrying out the method according to the invention, the height of the upper bed is adjusted, as well as the degree of segregation. By tailoring the continuous supply of coating material from the storage container and the continuous discharge thereof by the conveyor, it is possible to set a desired coating composition and thus a desired product appearance. The degree of segregation can be adjusted by adjusting the length of the slope of the pouring mound. The natural angle of inclination of the pouring mound is substantially determined by the kind of coating material. As a result of the movement of the conveyor, the angle of inclination of the pouring mound in operation is somewhat steeper than the natural angle of inclination. The length of the slope and thus the degree of segregation may be adjusted, for example, by changing the distance between the upstream edge of the discharge opening and the conveyor, advantageously using the discharge control means mentioned above. Usually, the length of the slope is 15-20 cm. In the prior art, the length of the slope is only a few centimetres, which is too short to achieve a sufficient degree of segregation. By adjusting the length of the slope, the appearance (coarse/fine) of the top and sides of the product can be controlled.

Advantageously, the excess coating material, which remains after coating, is returned to the storage container.

A second aspect relates to a preferred device for carrying out the method according to the invention, in particular coating at least the top of moving food products with at least one layer of free-flowing particulate coating material, which device comprises a conveyor having a conveying part for carrying food products, a storage container for coating material arranged over the conveyor and having a discharge opening. According to the invention, the device comprises flow control means for adjusting the length of the slope on the upstream side of a pouring mound of coating material to be formed on the conveying part of the conveyor. By means of these flow control means, the degree of segregation of coating material on the slope of the pouring mound formed can be set and thus the appearance of the top of the coated products. Advantageously, the flow control means comprise the above-mentioned discharge control means for adjusting the discharge of coating material from the storage container and flow restriction means for adjusting the throughput of coating material on the conveying part of the conveyor. Flow restriction means of this type determine, as stated above, the throughput of coating material on the upper part of the conveyor in such a manner that a pouring mound of coating material is created upstream thereof, while the discharge control means determine the height of the pouring mound.

Further preferred embodiments of the device according to the invention have already been described above as part of the detailed description of the method according to the invention.

Advantageously, the flow restriction means comprise a scraper element, such as a scraper panel, which is arranged at a height, preferably an adjustable height, over the conveying part. The scraper element, such as a vertical scraper panel, may be arranged at a fixed height, for example in the case of a fixed connection to the storage holder. Preferably, the height can be adjusted, so that the height of the upper bed and thus the amount of circulating coating material can thereby be adjusted.

In a further preferred embodiment, the flow restriction means comprise a levelling part extending in the conveying direction which is advantageously parallel to the conveying part. This levelling part levels the top of the upper bed of coating material and additionally exerts some pressure on it, so that the coating material adheres well to the food products.

In order to lower the mass of the pouring mound and thus the pressure on the food products and resistance upon the introduction thereof into the slope of the pouring mound, the flow restriction means advantageously comprise a build-up face which at least partially extends obliquely downwards in a direction opposite to the conveying direction. The function of this build-up face is to hollow out the pouring mound and thus to decrease said pressure and resistance. An angle of inclination of this build-up face with respect to the conveying part of approx. 45° has proved to be sufficient. A smaller angle of inclination increases the risk of coating material remaining on the build-up face, for example when the coating device is to be emptied.

In order to be able to adjust the length of the slope of the pouring mound, the height of the wall part of the storage container which delimits the discharge opening on the upstream side, is adjustable. Advantageously, said wall part comprises a slide valve. Alternatively, changing the distance between the conveying part and discharge opening and thus adjustment of the height of the pouring mound, could also be achieved by moving said wall part or the complete storage container upwards. The effect of a change in speed of the conveyor, and thus the amount of entrained material, only has a small effect on the length of the slope, so that the effect thereof on the degree of segregation is limited.

As already described, the conveyor advantageously consists of an endless conveyor belt which is pervious to particulate coating material, in which a guide plate is provided under the conveying part in the coating zone for displacing the coating material during conveyance. Preferably, collecting means for catching and collecting excess coating material are provided which are arranged downstream of the coating zone. One example thereof is a funnel with collecting tray and/or conveyor disposed at the end of the coating zone, under the upper part. Advantageously, the excess material is then collected in the drum conveyor which is also used for returning the coating material to the storage container for the upper bed or the coating station for producing a lower bed.

Figure 2:
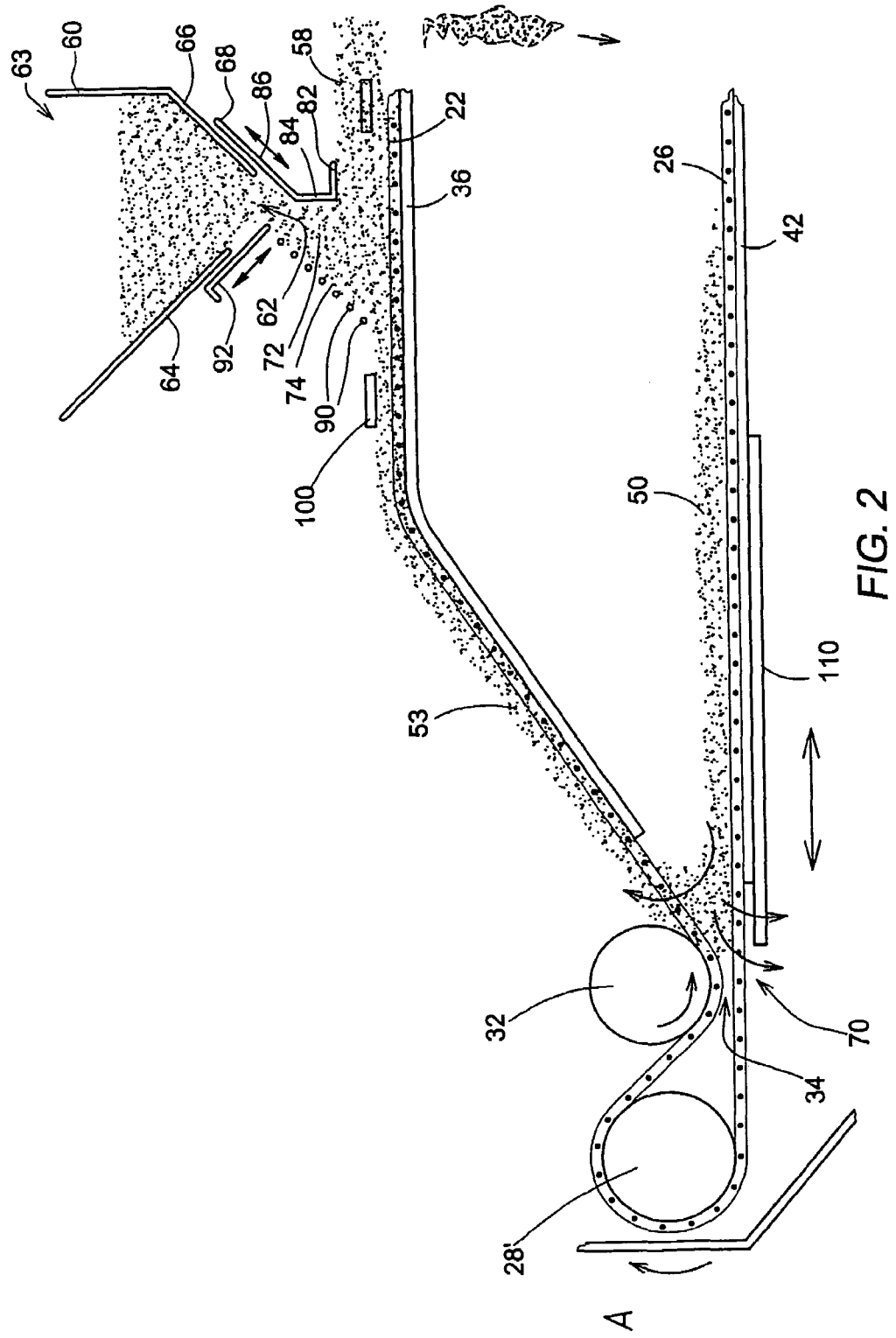
Figure 3:
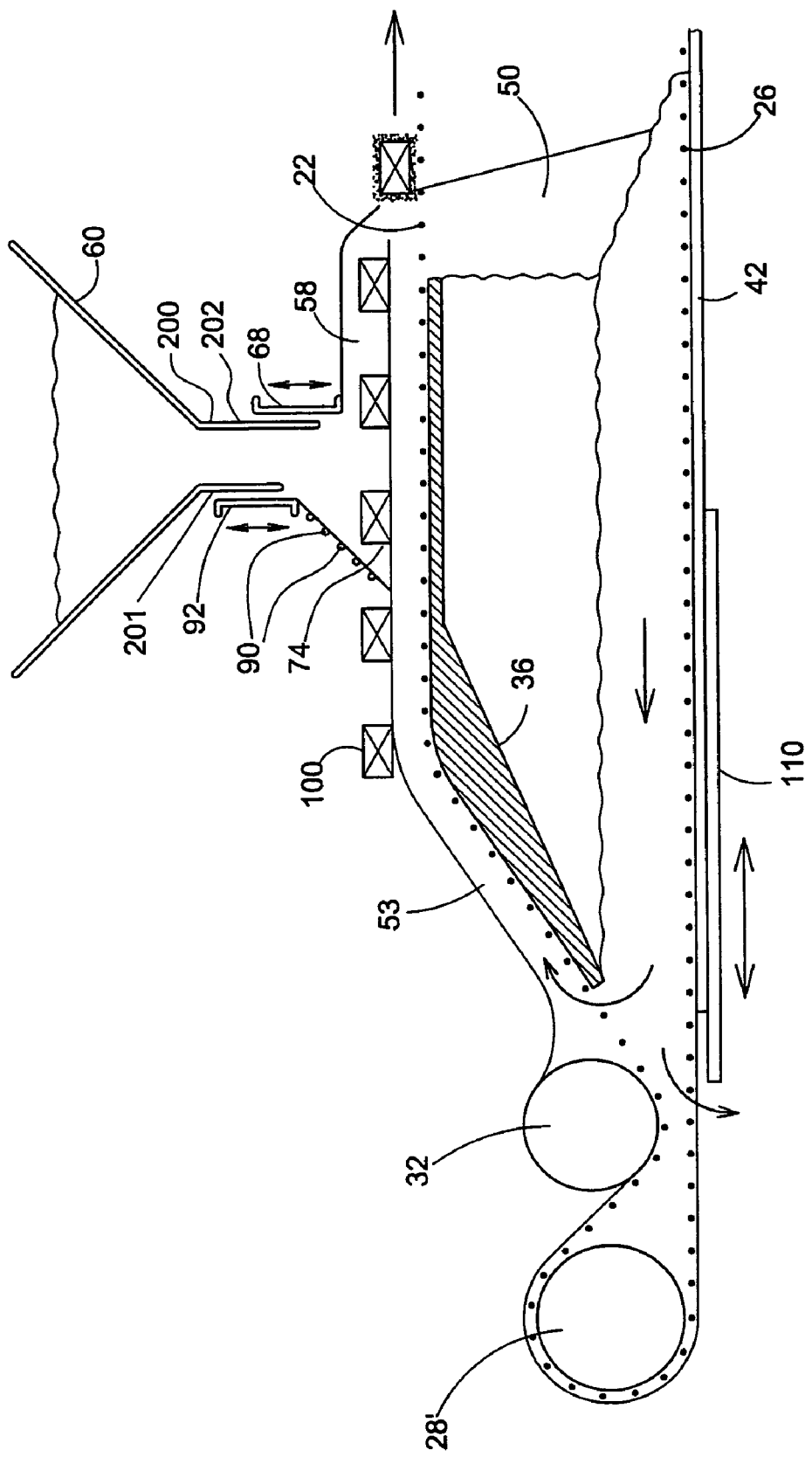

The invention will be explained below in more detail with reference to the following drawing, in which:

FIG. 1 shows a diagrammatic perspective view of an embodiment of a coating device according to the invention; and FIG. 2 shows a diagrammatic partial view of a detail of the coating device according to FIG. 1; and FIG. 3 shows a diagrammatic view of another embodiment of a coating device according to the invention.

FIG. 1 shows an embodiment of a coating device 10 according to the invention, which is suitable for coating food products on all sides. This coating device 10 comprises a movable frame 12 with swivelling wheels 13. The frame 12 bears a drum conveyor 14 which is arranged in a housing 16. At the product-introduction side, designated as A, the housing 16 comprises doors 18 which provide access to the drum conveyor 14, for example for inspection, maintenance or repair work. The drum conveyor 14 is used to form an upper bed of particulate coating material in order to coat the top of supplied products. The doors 18 leave clear an opening through which a conveyor belt (not shown) for supplying the products which are to be coated can extend. An endless conveyor belt 20 which is pervious to coating material, also known as a grill belt, is arranged in a receptacle 44 and is suitable for receiving the products. The conveyor belt 20 comprises a conveying part 22, which moves from the product-introduction side A of the device to the product-discharge side B, and a return part 26 (not shown in FIG. 1, see FIG. 2), which runs in the opposite direction. In the vicinity of the product-discharge side B there is a blowing device 23 with motor 24, which removes excess coating material from coated products. The drives of the conveyor belt 20 and the drum conveyor 14 are not shown in FIG. 1. In this embodiment, the lower bed is formed in a manner which is known from Netherlands patent 1020511 in the name of the Applicant. Other methods and devices for forming the lower bed are known to those skilled in the art.

FIG. 2 shows a side view of a part of the coating device 10. The conveyor 20 with conveying part 22 and return part 26 is guided through the device 10 over (driven) reversing roll 28 and guide rolls (not shown). In the vicinity of the front reversing roll 28' there is a guide roll 32 with an adjustable position. The conveying part 22 of the conveyor 20 is guided along the bottom of this guide roll 32, at a short distance from the return part 26, so that there is a gap between the two parts, denoted by reference numeral 34. Downstream of this guide roll 32 there is a guide plate 36 below the conveying part 22, extending from an uphill section, which is directed obliquely upwards, up to a horizontal section of the conveying part 22. The return part 26 moves just above the base 42 of the receptacle 44 (cf. also FIG. 1) with vertical side walls 46, which base 42 functions as a guide plate. After products have been coated, excess coating material 50, at the end 52 of the guide plate 36, drops through the conveying part 22 onto the return part 26 and base 42, as indicated by an arrow. The return part 26 returns the coating material 50 towards the product-introduction side A. On account of the restriction to the coating material resulting from the relative positions of the return part 26 and the conveying part 22 and the opposite directions of movement thereof, the coating material accumulates, as seen in the direction of movement of the return part 26, upstream of the guide roll 32, in a buffer zone, and when sufficient material has accumulated, it penetrates through the conveying part 22 and is carried obliquely upwards as a continuous layer of coating material, which is referred to here as lower bed 53. In this case, the buffer zone is delimited on the underside by the return part 26, at the top side by the conveying part 22 which extends obliquely upwards and in the direction of the product-introduction side A, by the guide roll 32 and that part of the conveying part 22 which is guided beneath this roll. The vertical side walls 46 delimit the sides of the buffer zone. The layer thickness of the lower bed 53 is determined by the position of the displaceable slide 110. After the lower bed 53 has been formed, the products 100 to be coated are placed thereon.

The top and sides of the products 100 are coated with the aid of the embodiment of the invention. With the embodiment illustrated in FIG. 2, an upper bed 58 is formed from a storage hopper 60, which is provided on the underside with a discharge opening 62. This discharge opening 62 is delimited downstream and upstream by obliquely slanting bottom wall parts 64 and 66, which together form a funnel. The discharge opening 62 extends over virtually the entire width of the conveyor 20. On the downstream side of the discharge opening 62, a scraper panel 68 is arranged, the position of which is adjustable, as indicated by a double arrow. Coating material flows out of the discharge opening 62 of the hopper 60 and a pouring mound 72 is formed upstream of the scraper panel because the scraper panel 68 offers a height-limited passage for the coating material. On its upstream side, the pouring mound 72 has a slope 74, which extends from the discharge opening 62 down to the lower bed 53. Along this slope 74, coarse particles 90 of the coating material roll downwards faster than the relatively fine particles. As a result of the continuous discharge of coating material on the conveying part 22 and continuous supply from the hopper 60, a continuously rolling slope develops, where segregation of the coating material supplied from the hopper into coarse and relatively fine particles takes place. The products 100, deposited on the lower bed 53, move along with the conveyor 20 and first come into contact with the coarse particles 90 of coating material before subsequently being completely covered with coating material in the pouring mound 72 and upper bed 58. This upper bed 58 is levelled by a levelling part 82 of the scraper element 68 which extends parallel to the conveying part 22 in the conveying direction. In the embodiment shown, the scraper element 68 comprises a build-up face 84 adjacent to the levelling part 82 which face in turn adjoins the guiding part 86. By positioning the scraper element 68, the height of the upper bed 58, determined by the levelling part 82, can be set. Due to the shape of the scraper element 68, the pouring mound 72 is hollowed out on the downstream side with respect to an embodiment in which the scraper element is placed vertically in a fixed position behind the downstream edge of the discharge opening. As a result, the introduction resistance against introduction of the products 100 into the pouring mound 72 is reduced in relative terms. In order to adjust the length of the slope 74 of the pouring mound 72, a slide panel 92 is arranged on the upstream side, the sliding direction of which in this case runs parallel to the respective hopper bottom wall part 64. In operation, the storage hopper 60 is filled via an introduction opening 63 with circulating coating material by the drum conveyor 14. If desired, fresh coating material may be supplied to the storage hopper 60 in order to maintain the amount of coating material within certain limits, which amount would otherwise decrease as a result of coating material being applied to products. The drum conveyor 14 comprises, for example, a driven wheel with compartments 120 (see FIG. 1) which are open on the inner side.. These compartments 120 are filled with a partial stream of the coating material which is returned by the return part 26. For this purpose, a discharge opening 70 is provided in base 42 upstream of the gap 34, it being possible for the size of this opening to be adjusted with the aid of a slide 110 which can be displaced in the horizontal direction. The upstream end of the slide 110 is, for example, secured to a horizontal pivot shaft and the other end to a spring structure, so that in the event of a maximum pressure being exceeded as a result of accumulated coating material, the slide 110 moves downwards and the material is carried with the drum conveyor 14 to the hopper 60. Any coating material which may have been spilled can be collected in a drawer 25 (cf. FIG. 1) which extends below the drum conveyor 14.

In the embodiment of a coating device according to the invention shown in FIG. 3, components which correspond with those in FIGS. 1 and 2 have been denoted by identical reference numerals. In this embodiment, the storage hopper 60 comprises a vertical discharge duct 200 with discharge opening 62. The duct section 201 which delimits the discharge opening 62 on the upstream side comprises a vertically displaceable slide 92, with which the length of the duct 200 can be adjusted on the upstream side and thus the position of the discharge opening 201 with respect to the conveying part 22 of the conveyor 20. On the downstream side, the duct section 202 comprises a vertically displaceable scraper panel 68, with which the height of the upper bed 58 is determined on the downstream side of the discharge opening and thus a pouring mound 72 is formed. The length of the slope 74 of the pouring mound 72 is adjusted by moving the slide 92. If the slide 92 is moved upwards, the height of the pouring mound 72, measured from the discharge opening 62 down to the upper bed 58 of conveying part 22 increases, and thus the length of the slope 74. The height of the pouring mound 72 and thus the slope length decrease if the slide 92 is moved downwards. Segregation of coating material into coarse particles 90 and relatively fine coating material takes place on the slope 74. The products 100 are placed on the lower bed 53 upstream of the pouring mound 72 and come into contact firstly with mainly the said particles 90 and subsequently with the mass of the pouring mound 72. The coating material moves by the conveying part 22 over the underlying guide plate 36. At the end of the guide plate 36, the excess coating material 50 drops through the conveyor 20 and is returned by the return part 26, as has been described in detail with reference to FIG. 2.

What is claimed is:

1. Device for coating at least a top of moving food products with at least one layer of a free-flowing particulate coating material, which device comprises:
    a conveyor with a conveying part for carrying food products in a conveying direction,
    a storage container comprising coating material, which container is arranged over the conveying part of the conveyor and has a discharge opening for discharging coating material onto the conveying part, and
    a pouring mound formed on the conveying part by the coating material discharged from the storage container onto the conveying part,
    wherein the pouring mound has, at an upstream side, a slope with respect to the conveying part of the conveyor, which slope extends over a length from the conveying part in the conveying direction towards the discharge opening whereby segregation of fine and coarse particles of the coating material takes place on the slope, and
    wherein the device is provided with a flow control device for adjusting the length of the slope on the upstream side of the pouring mound of coating material formed on the conveying part of the conveyor,
    wherein the flow control device comprises a discharge control device for adjusting the discharge of coating material from the storage container and a flow restriction device for adjusting the throughput of coating material on the conveying part of the conveyor, and
    wherein the flow restriction device comprises a scraper element having an underside at an adjustable distance from the conveying part of the conveyor.

2. Device according to claim 1, wherein the flow restriction device comprises a build-up face which at least partially extends opposite to conveying direction.

3. Device according to claim 1, wherein the storage container comprises a wall part having a height, and the height of the wall part of the storage container, which delimits the discharge opening on the upstream side, is adjustable.

4. Device according to claim 3, wherein the wall part comprises a slide valve.

5. Device according to claim 1, wherein the conveyor is an endless conveyor belt pervious to particulate coating material, and a guide plate is arranged under the conveying part thereof in a coating zone for moving the coating material on the conveying part.

6. Device according to claim 1, wherein the device is provided with a collecting device for catching and collecting excess coating material, which are arranged downstream of a coating zone.

7. Device according to claim 6, wherein the device is provided with a circulating device for returning coating material from the collecting device to the storage container.

8. Device according to claim 1, further comprising a product supply for delivering products to be coated onto the conveying part, the product supply being arranged upstream of the pouring mound.

9. Device for coating at least a top of moving food products with at least one layer of a free-flowing particulate coating material, which device comprises:
    a conveyor with a conveying part for carrying food products in a conveying direction,
    a storage container comprising coating material, which container is arranged over the conveying part of the conveyor and has a discharge opening for discharging coating material onto the conveying part, and a pouring mound formed on the conveying part by the coating material discharged from the storage container onto the conveying part, wherein the pouring mound has, at an upstream side, a slope with respect to the conveying part of the conveyor, which slope extends over a length from the conveying part in the conveying direction towards the discharge opening whereby segregation of fine and coarse particles of the coating material takes place on the slope, and wherein the device is provided with a flow control device for adjusting the length of the slope on the upstream side of the pouring mound of coating material formed on the conveying part of the conveyor, wherein the flow control device comprises a discharge control device for adjusting the discharge of coating material from the storage container and a flow restriction device for adjusting the throughput of coating material on the conveying part of the conveyor, and wherein the flow restriction device comprises a leveling part which extends in conveying direction.

10. Device according to claim 9, wherein the leveling part is directed parallel to the conveying part of the conveyor.

11. Device for coating at least a top of moving food products with at least one layer of a free-flowing particulate coating material, which device comprises a conveyor with a conveying part for carrying food products in a conveying direction, as well as a storage container for coating material arranged over the conveying part of the conveyor and having a discharge opening enabling the coating material to form a mound having a slope with an upstream length on the conveyor, wherein the device is provided with a flow control device for adjusting the length of the slope on the upstream side of the mound, wherein the flow control device comprises a discharge control device for adjusting the discharge of coating material from the storage container and a flow restriction device for adjusting the throughput of coating material on the conveying part of the conveyor, wherein the flow restriction device comprises a scraper element having an underside at an adjustable distance from the conveying part of the conveyor.

12. Device according to claim 11, wherein the flow restriction device comprises a leveling part which extends in the conveying direction.

13. Device according to claim 12, wherein the leveling part is directed parallel to the conveying part of the conveyor.

14. Device according to claim 11, wherein the flow restriction device comprises a build-up face which at least partially extends opposite to the conveying direction.

15. Device for coating at least a top of moving food products with at least one layer of a free-flowing particulate coating material, which device comprises a conveyor with a conveying part for carrying food products in a conveying direction, as well as a storage container for coating material arranged over the conveying part of the conveyor and having a discharge opening enabling the coating material to be discharged on the conveyor, wherein the device is provided with a flow control device comprising a discharge control device for adjusting the discharge of coating material from the storage container and a flow restriction device for adjusting the throughput of coating material on the conveying part of the conveyor, wherein the flow restriction device comprises a scraper element having an underside at an adjustable distance from the conveying part of the conveyor.

16. Device according to claim 15, wherein the flow restriction device comprises a leveling part which extends in the conveying direction.

17. Device according to claim 16, wherein the leveling part is directed parallel to the conveying part of the conveyor.

18. Device according to claim 15, wherein the flow restriction device comprises a build-up face which at least partially extends opposite to the conveying direction.

* * * * *